(12) United States Patent
Miyashita et al.

(10) Patent No.: US 10,442,425 B2
(45) Date of Patent: Oct. 15, 2019

(54) WORK VEHICLE

(71) Applicant: Kubota Corporation, Osaka-shi (JP)

(72) Inventors: Shunsuke Miyashita, Sakai (JP); Yukifumi Yamanaka, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/355,522

(22) Filed: Nov. 18, 2016

(65) Prior Publication Data
US 2017/0267104 A1 Sep. 21, 2017

(30) Foreign Application Priority Data

Mar. 16, 2016 (JP) .................. 2016-052377

(51) Int. Cl.
| | |
|---|---|
| B60L 7/10 | (2006.01) |
| B60W 20/14 | (2016.01) |
| B60K 6/24 | (2007.10) |
| B60K 6/26 | (2007.10) |
| B60K 6/28 | (2007.10) |
| B60K 6/543 | (2007.10) |
| B60K 6/52 | (2007.10) |

(Continued)

(52) U.S. Cl.
CPC ............. *B60W 20/14* (2016.01); *B60K 1/00* (2013.01); *B60K 1/04* (2013.01); *B60K 6/24* (2013.01); *B60K 6/26* (2013.01); *B60K 6/28* (2013.01); *B60K 6/48* (2013.01); *B60K 6/52* (2013.01); *B60K 6/543* (2013.01); *B60K 17/354* (2013.01); *B60K 17/356* (2013.01); *B60L 7/14* (2013.01); *B60K 2001/001* (2013.01); *B60K 2001/0422* (2013.01); *B60K 2005/003* (2013.01); *B60L 2200/40* (2013.01); *B60L 2240/421* (2013.01); *B60L 2250/26* (2013.01); *B60L 2260/28* (2013.01); *B60P 1/28* (2013.01); *B60R 21/13* (2013.01); *B60R 2021/0018* (2013.01); *B60Y 2200/20* (2013.01); *B60Y 2200/92* (2013.01); *B60Y 2400/112* (2013.01);
(Continued)

(58) Field of Classification Search
CPC . B60L 7/10; B60W 20/14; B60K 6/24; B60K 6/26; B60K 6/28
USPC ........................................................ 180/243
See application file for complete search history.

(56) References Cited

U.S. PATENT DOCUMENTS 6,166,499 A * 12/2000 Kanamori ................ B60K 6/26
180/65.24
7,378,808 B2 * 5/2008 Kuras ....................... B60K 6/46
307/10.1
(Continued)

FOREIGN PATENT DOCUMENTS

JP 10310398 A 11/1998
JP 2001139296 A 5/2001
(Continued)

*Primary Examiner* — Jacob D Knutson
(74) *Attorney, Agent, or Firm* — The Webb Law Firm

(57) ABSTRACT

A work vehicle includes a propelling device, which consists of a pair of right and left front wheels and a pair of right and left rear wheels, an engine configured to drive one of the pair of front wheels and the pair of rear wheels, an electric motor configured to drive the other of the pair of front wheels and the pair of rear wheels, a battery configured to supply electric power to the electric motor, and a controller configured to control the electric motor. The controller performs regeneration control at constant current value to charge the battery with regenerative power of the electric motor at a constant current value regardless of rotation speed of the electric motor.

1 Claim, 3 Drawing Sheets

(51) Int. Cl.
*B60K 6/48* (2007.10)
*B60K 1/00* (2006.01)
*B60K 1/04* (2019.01)
*B60K 17/354* (2006.01)
*B60K 17/356* (2006.01)
*B60L 7/14* (2006.01)
*B60R 21/00* (2006.01)
*B60R 21/13* (2006.01)
*B60P 1/28* (2006.01)
*B60K 5/00* (2006.01)

(52) U.S. Cl.
CPC ......... *B60Y 2400/72* (2013.01); *Y02T 10/642* (2013.01); *Y10S 903/916* (2013.01); *Y10S 903/947* (2013.01)

(56) References Cited

U.S. PATENT DOCUMENTS

| | | | |
|---|---|---|---|
| 2003/0034188 A1 | 2/2003 | Gotou | |
| 2013/0164109 A1* | 6/2013 | Yamazaki | E02F 9/2075 414/744.2 |
| 2013/0313035 A1* | 11/2013 | Jenkins, Jr. | B60K 6/52 180/243 |
| 2015/0258897 A1* | 9/2015 | Okada | B60L 7/14 318/376 |

FOREIGN PATENT DOCUMENTS

| | | |
|---|---|---|
| JP | 2002218601 A | 8/2002 |
| JP | 200361207 A | 2/2003 |

\* cited by examiner

WORK VEHICLE

CROSS-REFERENCE TO RELATED APPLICATION

This application claims priority to Japanese Patent Application No. 2016-052377 filed Mar. 16, 2016, the disclosure of which is hereby incorporated in its entirety by reference.

BACKGROUND

Japanese Unexamined Patent Application Publication No. 2003-61207 discloses an example of a work vehicle that charges a battery with regenerative power of an electric motor for driving a propelling device. The electric motor or motor generator drives a pair of front wheels, and the battery supplies the electric motor with electric power. The work vehicle further includes an engine for driving a pair of rear wheels. The electric motor also acts as a power generator for charging the battery with regenerative power of the electric motor while the vehicle is running.

In this vehicle, when regenerative power of the electric motor varies with rotation speed of the electric motor, regenerative power of the electric motor supplied to the battery also varies. Thus, it is difficult to stably supply regenerative power of the electric motor to the battery, and to estimate the time required for charging the battery.

There is a growing demand for a work vehicle which supplies regenerative power of the electric motor to the battery in a stable manner and easily estimates the time required for charging the battery.

SUMMARY

A work vehicle disclosed herein includes a propelling device, which consists of a pair of right and left front wheels and a pair of right and left rear wheels, an engine configured to drive one of the pair of front wheels and the pair of rear wheels, an electric motor configured to drive the other of the pair of front wheels and the pair of rear wheels, a battery configured to supply electric power to the electric motor, and a controller configured to control the electric motor. The controller performs regeneration control at constant current value to charge the battery with regenerative power of the electric motor at a constant current value regardless of rotation speed of the electric motor.

With the above arrangement, when the battery runs out of electric power, the controller charges the battery with regenerative power of the electric motor if the vehicle can be propelled by the driving power from the engine. Since the battery is charged with regenerative power of the electric motor at a constant current value regardless of the rotation speed of the electric motor, the controller supplies the battery with regenerative power of the electric motor in a stable manner, and easily estimates the time required for charging the battery when the rotation speed of the electric motor varies.

In one or more embodiments, the controller performs the regeneration control at constant current value when the rotation speed of the electric motor is equal to or greater than a reference value.

With the above arrangement, the electric motor rotates at rotation speed equal to or greater than the reference value to charge the battery with its regenerative power at a constant high current value. As a result, it is possible to shorten the time required for charging the battery and to supply the battery with regenerative power of the electric motor in a stable manner.

In one or more embodiments, the controller performs the regeneration control at constant current value at least in a forward-drive state or in a reverse-drive state.

With the above arrangement, the battery is charged with the regenerative power of the electric motor not only in the forward-drive state but also in the reverse-drive state, which can shorten the time required for charging the battery.

DETAILED DESCRIPTION

Figure 1:
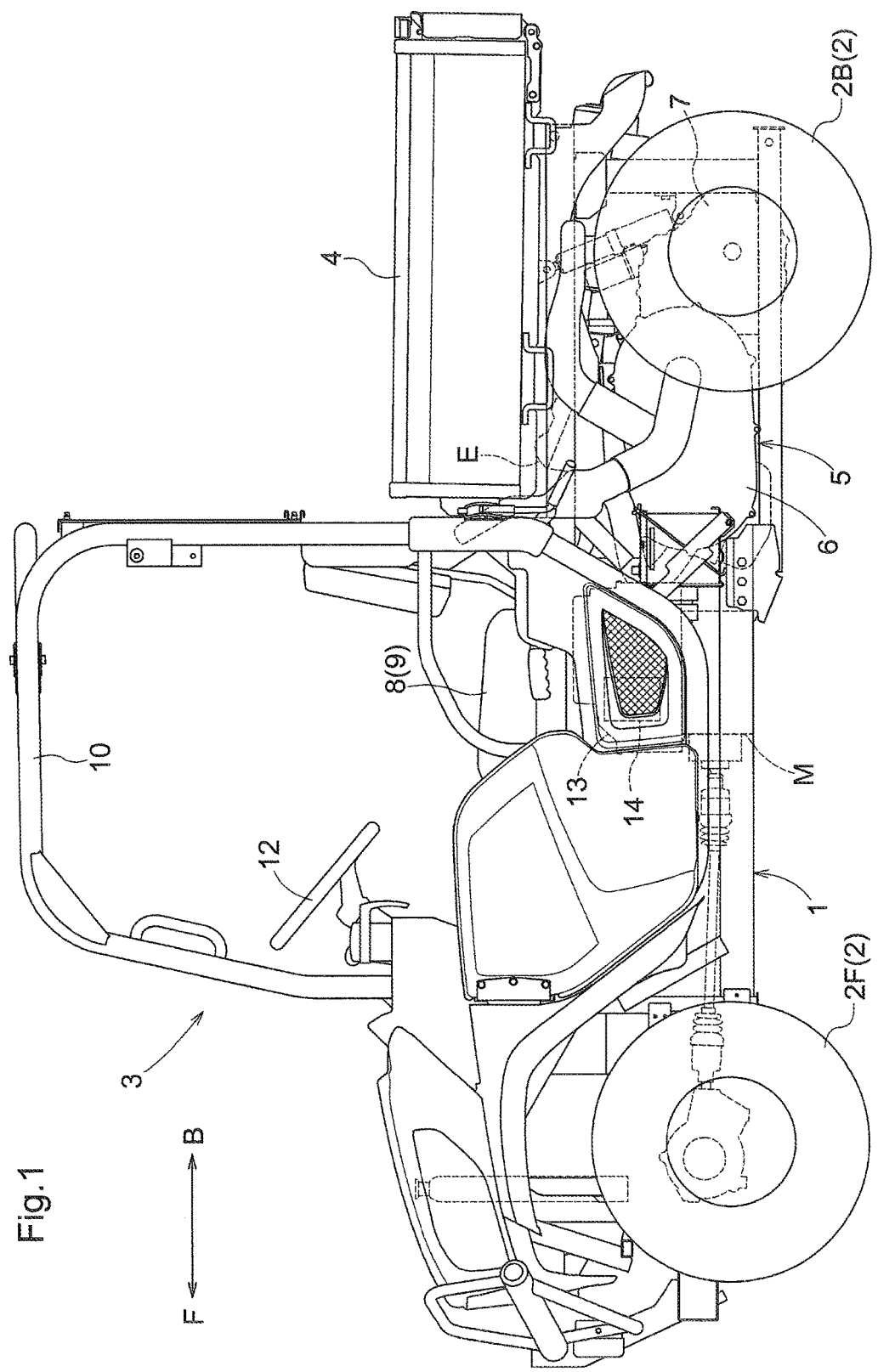
FIG. 1 is a left side view of a utility vehicle.

Embodiments of a work vehicle will be described hereinafter in reference to the accompanying drawings. In the drawings, the direction "F" and the direction "B" shown in FIGS. 1 and 2 are defined as "forward" and "rearward," respectively, and the direction "R" and the direction "L" shown in FIG. 2 are defined as "right" and "left," respectively.

[Overall Construction of Utility Vehicle]

Figure 2:
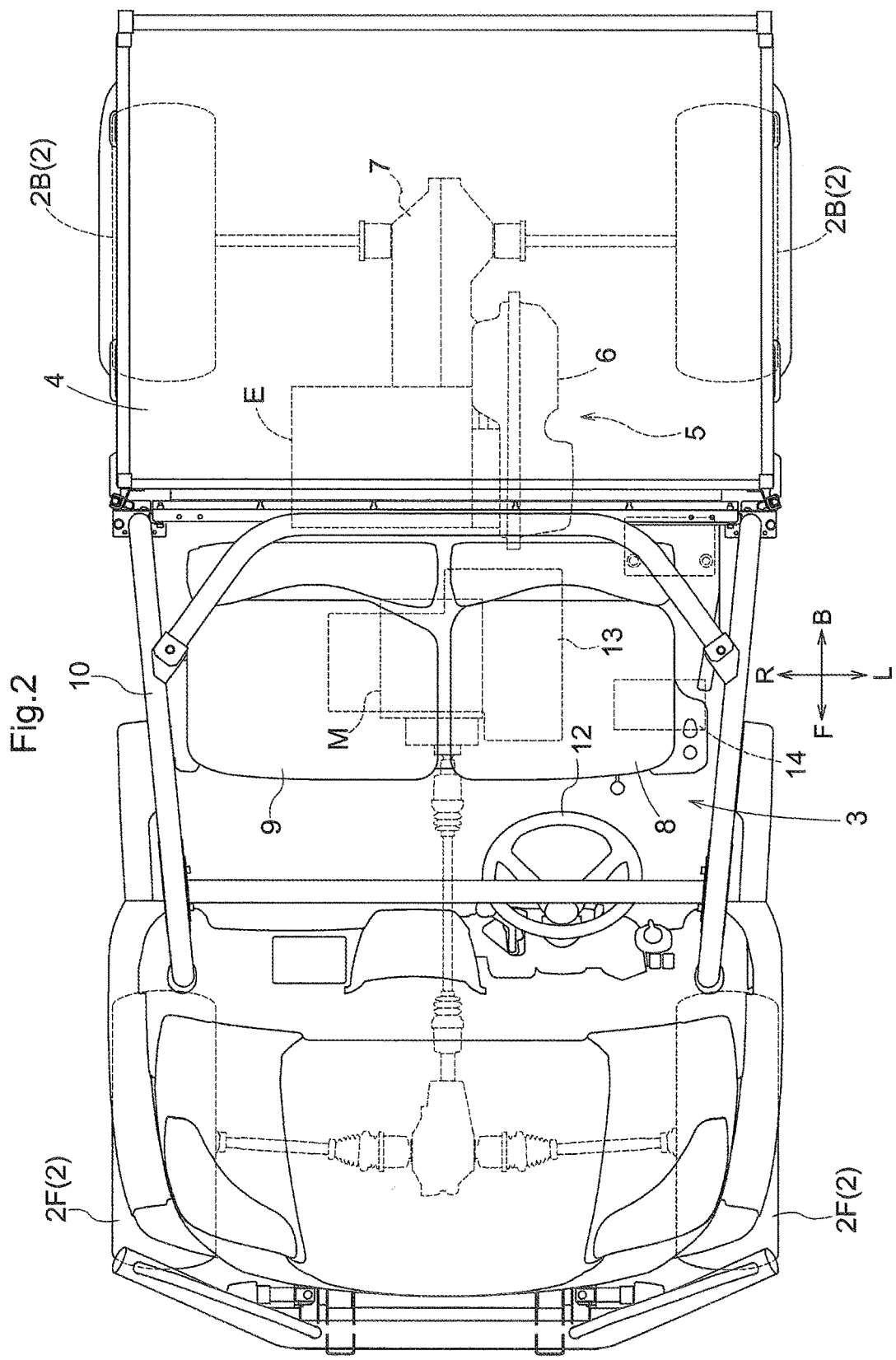
FIG. 2 is a top plan view of the utility vehicle.

FIGS. 1 and 2 show a hybrid utility vehicle as an example of a work vehicle, which includes an engine E and an electric motor M as driving sources. The utility vehicle further includes a vehicle frame 1, and a wheel-type propelling device 2 that supports the vehicle frame 1. The propelling device 2 includes a pair of right and left steerable and driving front wheels 2F, and a pair of right and left driving rear wheels 2B. The utility vehicle is switchable in running mode between a 4WD mode in which a driving force from the engine E is transmitted to the right and left rear wheels 2B and a driving force from the electric motor M is transmitted to the right and left front wheels 2F, a 2WD mode in which the driving force from the engine E is transmitted to the rear wheels 2B and the driving force from the electric motor M is not transmitted to the right and left front wheels 2F, and an EV mode in which the driving force from the electric motor M is transmitted to the right and left front wheels 2F and the driving force from the engine E is not transmitted to the right and left rear wheels 2B.

The utility vehicle further includes a driver's section 3 mounted in a middle part of the vehicle frame 1 in a vehicle front-rear direction for a driver to get on, a loading platform 4 mounted rearward of the vehicle frame 1, and a motor section 5 mounted below the loading platform 4. The loading platform 4 is vertically pivotable about a rear pivotal point for dumping or discharging a load rearward. The motor section 5 includes the engine E, a belt variable speed transmission 6 for changing driving power from the engine E steplessly, and a transmission 7 for changing and transmitting the driving power from the belt variable speed transmission 6 to the propelling device 2 (the right and left rear wheels 2B). The transmission 7 includes a gear transmission and a differential mechanism, which are not shown, for example.

[Driver's Section]

Figure 3:
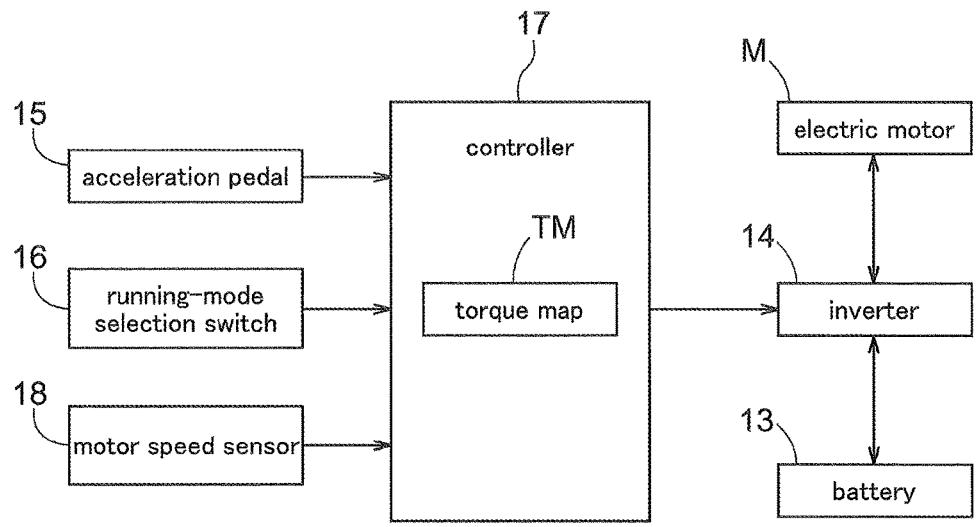
FIG. 3 is a block diagram showing a control system of a controller.

The driver's section 3 includes a driver's seat 8, a passenger seat 9, a roll-over protection structure (ROPS) 10, and a steering wheel 12. Referring to FIG. 3, the driver's section 3 further includes an acceleration pedal 15 for determining propelling speed, and a running-mode selection switch 16 for switching the running mode. Under the driver's section 3 are provided the electric motor M for driving the right and left front wheels 2F, a battery 13 for supplying electric power to the electric motor M, and an inverter 14 for converting the electric power between the electric motor M and the battery 13.

[Controller]

Referring to FIG. 3, the utility vehicle further includes a controller 17 for controlling the electric motor M. The controller 17 receives a control signal from the acceleration pedal 15, a switching signal from the running-mode selection switch 16, and a detection signal from a motor speed sensor 18 for detecting rotation speed N of the electric motor M. The controller 17 has a torque map TM.

Figure 4:
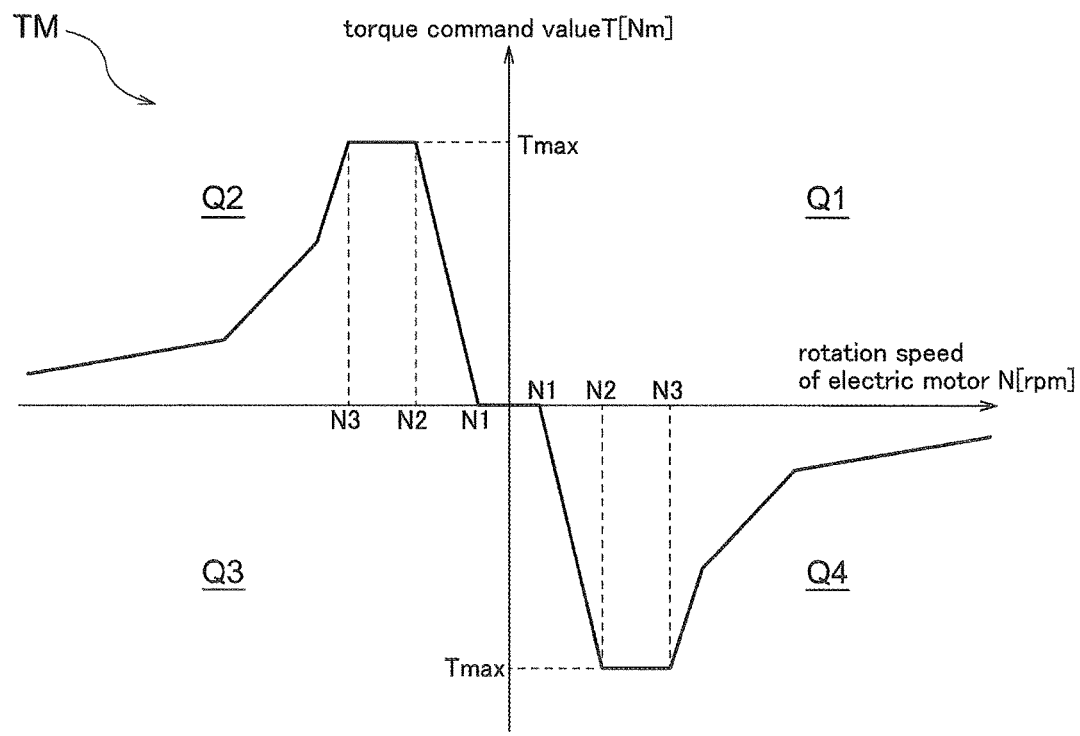
FIG. 4 is a graphic representation showing relationships between rotation speed of an electric motor and a torque command value.

Referring to FIG. 4, the torque map TM displays relationships between the rotation speed N of the electric motor M in the axis of abscissas and a torque command value T in the axis of ordinates. The fourth quadrant Q4 in the torque map TM displays relationships between the rotation speed N of the electric motor M and the torque command value T in a forward-drive regeneration region, and the second quadrant Q2 in the torque map TM displays relationships between the rotation speed N of the electric motor M and the torque command value T in a reverse-drive regeneration region. The profile in the fourth quadrant Q4 (i.e., the profile showing the relationships between the rotation speed N of the electric motor M and the torque command value T in the forward-drive regeneration region) and the profile in the second quadrant Q2 (i.e., the profile showing the relationships between the rotation speed N of the electric motor M and the torque command value T in the reverse-drive regeneration region) are in point symmetry about the origin. FIG. 4 omits illustrations of relationships between the rotation speed N of the electric motor M and the torque command value T in a forward-drive power-running region to be shown in the first quadrant Q1 in the torque map TM, and relationships between the rotation speed N of the electric motor M and the torque command value T in a reverse-drive power-running region to be shown in the third quadrant Q3 in the torque map TM.

[Regeneration Control for Electric Motor]

Next, regeneration control for the electric motor M will be described in reference to FIG. 4. When the rotation speed N of the electric motor M is not more than a first reference rotation speed N1, the controller 17 sets the torque command value T to zero and send the torque command value T to the inverter 14. In other words, the battery 13 is not charged with regenerative power of the electric motor M when the rotation speed N of the electric motor M is not more than the first reference rotation speed N1. Here, the first reference rotation speed N1 may be set to the rotation speed N of the electric motor M when the vehicle runs at low speed (e.g., lower speed than several kilometers per hour).

When the rotation speed N of the electric motor M is not less than the first reference rotation speed N1 and not more than a second reference rotation speed N2, the controller 17 sets the torque command value T within a range from zero to an upper limit torque value Tmax to increase in proportion to increase in rotation speed N of the electric motor M, and sends the torque command value T to the inverter 14. In other words, the battery 13 is charged with regenerative power of the electric motor M when the rotation speed N of the electric motor M is greater than the first reference rotation speed N1.

When the rotation speed N of the electric motor M is not less than the second reference rotation speed N2 and not more than a third reference rotation speed N3, the controller 17 sets the torque command value T to the upper limit torque value Tmax and sends the torque command value T to the inverter 14. In other words, the torque command value T is maintained at the upper limit torque value Tmax when the rotation speed N of the electric motor M is not less than the second reference rotation speed N2 and not more than the third reference rotation speed N3.

When the rotation speed N of the electric motor M is not less than the third reference rotation speed N3, which corresponds to "reference value" in this disclosure, the controller 17 performs regeneration control at constant current value, in which the battery 13 is charged with regenerative power of the electric motor M at a constant current value regardless of the rotation speed N of the electric motor M. More particularly, the current value of regenerative power of the electric motor M is kept constant regardless of the rotation speed N of the electric motor M when the rotation speed N of the electric motor M is not less than the third reference rotation speed N3. In this case, the torque command value T decreases from the upper limit torque value Tmax in inverse proportion to the increase in rotation speed N of the electric motor M. Here, the constant current value may be determined to prevent heat generation from the battery 13, for example.

With such an arrangement, when the battery 13 runs out of electric power, the controller 17 charges the battery 13 with regenerative power of the electric motor M if the vehicle can be propelled by the driving power from the engine E. Since the battery 13 is charged with regenerative power of the electric motor M at a constant current value regardless of the rotation speed N of the electric motor M, the controller 17 supplies the battery 13 with regenerative power of the electric motor M in a stable manner, and easily estimates the time required for charging the battery 13 when the rotation speed N of the electric motor M varies.

Alternative Embodiments

1. In the above embodiment, the controller 17 performs the regeneration control at constant current value when the rotation speed N of the electric motor M is not less than the third reference rotation speed N3. The "reference value" disclosed herein is not limited to the third reference rotation speed N3, but may be any suitable rotation speed N.

2. In the above embodiment, the controller 17 performs the regeneration control at constant current value either in a forward-drive state or in a reverse-drive state. Instead, the controller 17 may perform the regeneration control at constant current value only in the forward-drive state.

3. The relationships between the rotation speed N of the electric motor M and the torque command value T as disclosed herein are only exemplary and are not limited to the ones shown in the torque map TM.

4. In the above embodiment, the right and left front wheels 2F are driven by the electric motor M, and the right and left rear wheels 2B are driven by the engine E. Instead, the right and left front wheels 2F may be driven by the engine E, and the right and left rear wheels 2B may be driven by the electric motor M.

What is claimed is:

1. A work vehicle comprising:
a propelling device including a pair of right and left front wheels, and a pair of right and left rear wheels;
an engine configured to drive one of the pair of front wheels and the pair of rear wheels;
an electric motor configured to drive the other of the pair of front wheels and the pair of rear wheels;
a battery configured to supply electric power to the electric motor; and
a controller configured to control the electric motor,
wherein the controller performs regeneration control at a constant current value to charge the battery with regenerative power of the electric motor at maximum constant current value when a rotation speed of the electric motor exceeds a reference value, and
wherein the controller performs the regeneration control at the constant current value at least in a forward-drive state and in a reverse-drive state of the work vehicle.

* * * * *